June 3, 1924.
F. M. SLOUGH
1,496,073
ELECTRIC POWER SYSTEM
Filed Jan. 17, 1921
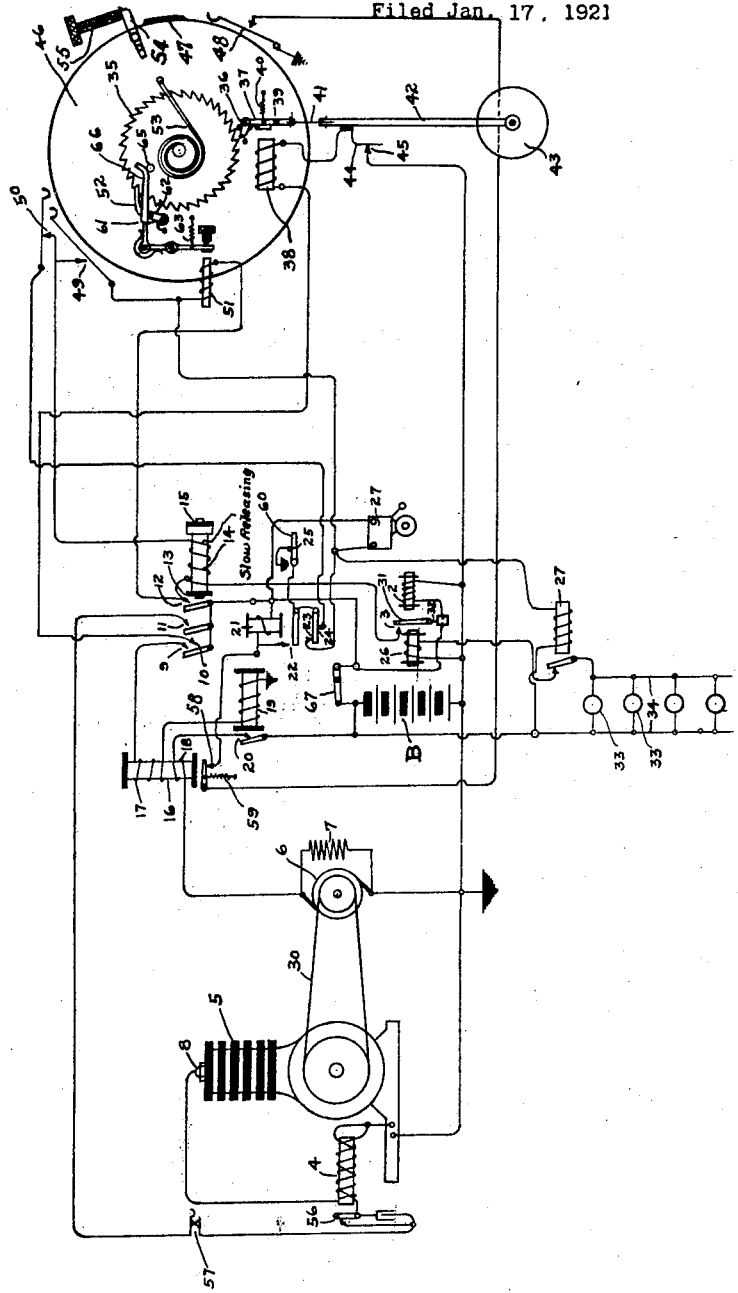
INVENTOR
Franklin M. Slough
BY Richey Slough & Trees
His ATTORNEYS.

Patented June 3, 1924.

1,496,073

UNITED STATES PATENT OFFICE.

FRANK M. SLOUGH, OF ELYRIA, OHIO, ASSIGNOR TO ASHTON G. BEAN, OF ELYRIA, OHIO.

ELECTRIC POWER SYSTEM.

Application filed January 17, 1921. Serial No. 437,710.

*To all whom it may concern:*

Be it known that I, FRANK M. SLOUGH, a citizen of the United States, residing at Elyria, in the county of Lorain and State of Ohio, have invented certain new and useful Improvements in Electric Power Systems, of which the following is a full, clear, concise, and exact description, such as will enable others skilled in the art to which my invention appertains to make and use the same.

My invention relates to electric power systems, and more particularly to such electric power systems as are especially adaptable for use in places remote from a central station electric power plant, such as in rural districts, although my invention is not confined to such use.

It is an object of my invention to provide an improved power system employing storage batteries, a dynamo to charge the storage batteries, and a source of power whereby to drive the dynamo, the system being so arranged that the charging of the storage batteries will be automatically started by apparatus, preferably automatically actuated, and preferably dependent for its operation upon the state of charge of the storage battery.

It is a special object of my present invention also to provide apparatus to discontinue the charging of the storage batteries after the charging apparatus has been in operation for a predetermined length of time, such apparatus being independent of the amount of charging accomplished during the charging period.

Another object of my invention is to provide apparatus for starting the charging of the storage battery at a time earlier than would otherwise be the case, whenever a predetermined amount of load is thrown upon the storage battery, such as operating electric motors which consume a considerable amount of current from the storage battery.

It is a further object of my invention to provide means whereby the charging will be started upon varying predetermined conditions of the state of charge of the storage battery, depending upon the amount of external load placed on the storage battery.

It is a further object of my invention to provide timing means for causing the charging of the storage battery to be discontinued, and which timing means may also be employed to discontinue the effort of the apparatus to start the charging apparatus into operation, whenever such apparatus is in operation for a predetermined length of time after the effort has been initiated.

Other objects of my invention and the invention itself will become apparent as the description thereof progresses, and in which description reference will be had to the accompanying drawing forming a part of the specification. The single figure shows the arrangement used.

Referring to the drawing, at 5 is shown a prime mover, such as an internal combustion engine, which is mechanically linked with an electric starting-generating dynamo 6, such as by a belt 30. The motor-dynamo is of that type well known in the art, which is capable of being efficiently operated as a motor when current is supplied to it, and efficiently operated as a dynamo when driven by a source of power, such as the internal combustion engine 5. Such starting-generating dynamo is usually of the shunt-wound type having a shunt field winding indicated at 7. The gas engine has associated with it a source of ignition current, indicated at 4, having primary and secondary windings, one terminal of the secondary winding being connected to the spark plug of the engine at 8. The storage battery of the system is shown at B and comprises a plurality of cells of battery.

At 2 I have provided an electromagnet winding, capable of exerting a magnetic attraction upon the armature 31 against the power of a spring 32, so as to normally maintain separated the contact set 3. At 26 is shown a relatively low resistance electromagnet capable, when current is passing through it, of opposing the effect of the magnet 2. The winding of the magnet 2 is connected across the terminals of the battery B and will hereinafter be referred to as the voltage winding.

The winding 26 is connected in series with the external load of the system, comprising electro-responsive devices shown at 33, said devices comprising switches to connect them in and out of circuit across the service leads 34. A relay having a winding 14, preferably so constructed as to be slow-releasing, is included in the circuit of the contacts 3 and is adapted to be operated whenever the contacts 3 are closed, in order to start the charging of the storage batteries. Relays 16, 19, 21 and 27 are also provided to control the electrical circuits of the system in a manner which will later be made apparent.

A timing mechanism is shown to the right of the drawing, comprising a ratchet wheel 35 and a pawl 36 for advancing the said ratchet wheel, said pawl being mounted on an armature 37 adapted to be operated by an electromagnet 38, whenever the said electromagnet is energized. The said armature is pivoted at a point 39 and is provided with a spring 40 for retracting the armature whenever the magnet 38 is de-energized. Suspended from a lower portion of the armature 37 by a flat spring 41 is a pendulum having an intermediate stiffened portion 42 and a weight 43. This pendulum intermediate portion carries a spring 44 adapted to make contact with the contact 45 whenever the pendulum is in the normal position shown in the drawing, until the weight 43 is swung to the right to break the said contacts 44—45, such breaking being caused by the energization of the magnet 38 to cause the magnet 38 to attract its armature 37.

It will be obvious that when current is supplied through the winding of the magnet 38, the contacts 44—45 will be intermittently operated, the circuit of the magnet 38 being intermittently broken as the pendulum swings to and fro under the influence of the attracted and retracted armature. At each attraction of the armature 37, the pawl 36 will advance the ratchet wheel 35 a single step, thus moving the electrical contact operating wheel 46 in a clockwise direction. On the periphery of the contact operating wheel 46 a projection 47, preferably of insulating material, is carried and adapted when the wheel is sufficiently rotated to close the contacts 48 after a period of time, which is predetermined, and which would be a relatively short time, sufficient under ordinary conditions for the plant when starting to have accomplished the engine cranking function, so that the battery would have commenced to receive a charge. However, in passing, it will be understood that whereas I have only shown a single wheel operated by a single toothed wheel associated with the timing apparatus, in practice, in order to provide a sufficiently long period in which certain contacts, such as the contacts 49 and 50, are operated, a plurality of wheels, suitably geared together, would ordinarily be used, a single wheel, however, serving to make plain my invention. The size of the wheel 46 or the number of wheels provided is also to be arranged, so that after a predetermined length of time, subsequent to the starting of the charging period, and which would also be a considerable length of time after the closure of the contacts 48, when these are provided, the contacts 49 and 50 will be operated one soon after the other, in the order mentioned. Whenever the projection 47 has reached a position wherein the contacts 50 are opened, the charging will be discontinued, and the apparatus will be restored to normal.

Associated with the timing mechanism is a restoring mechanism under the control of a magnet 51, which will withdraw the holding pawl 52 from engagement with the toothed ratchet wheel 35, upon an energization and subsequent deenergization of the said electromagnet 51. When this is accomplished, the restoring spring 53 will restore the timing apparatus to normal position, as shown in the drawings, wherein the member 54 carried by the wheel 46 comes into contact with the adjustable stop screw member 55.

I will now describe the operation of the system. We will assume that the battery has become discharged to a predetermined degree, wherein the electromagnet 2 having a winding connected across the terminals of the storage battery B is insufficient to maintain the contacts 3 open, and that these contacts are closed. This will cause a circuit to be closed, connecting the storage battery B through the said contacts 3, including the winding of the electromagnet 14, said circuit also including the normally closed contact 50 of the timing mechanism, the normally closed contacts of the relay 21 and normally closed key contacts 25. The relay 14 will thereupon be energized and will immediately close an energizing circuit for itself, comprising the contacts 13, which are then closed, said contacts 13 being bridged across the contacts 3, so that the above circuit is maintained closed independently of the contacts 3. The relay 14 being operated, will close its contact sets 9, 10, 11 and 12, in addition to the contacts 13, for purposes to be described. The closure of the contacts 11 completes the circuit of the primary winding of the high tension ignition coil 4, said circuit comprising the vibrator contacts 56, the timing contacts 57 and the storage battery B. The contacts 9 being closed, will energize the relay 19 to cause it to close its contacts 20, which are adapted to connect the starting-generating dynamo 6 across the terminals of the storage battery B, by a circuit which includes a low resistance series winding 18 of the relay 16. The high resistance winding 17 of the relay 16 is also energized in the circuit comprising the winding of the relay 19 and the closed contacts 9. The two windings 17 and 18 of the relay 16 are connected so as to operate differentially by current from the battery B when current from the battery B is flowing to the starting-generating dynamo 6, so that the contacts 58 of the relay 16 will remain closed, being maintained closed by the action of a retractible spring 59.

The relay 16 is of that type known in the art as an automatic cut-out switch, and contains a high and a low resistance winding, each adapted to oppose the magnet effect of the other upon the control set of contacts when the starting-generating dynamo is being used to crank the engine, or when the engine is ineffective to charge the battery. The contacts controlled by the relay 16 are maintained closed, except when the dynamo is charging the battery at more than a predetermined rate, it requiring something more than the effect of the winding 17 to overcome the power of the retractile spring 59.

The closure of the contacts 12 will be ineffective to produce any operative result at this time, but condition the circuit of the restoring magnet 51 of the timing mechanism for operation later on. The contacts 10 being closed, causes the energization of the magnet 38 to attract its armature 37, which will operate the pawl 36 to step the toothed wheel 35 one step. The attraction of the armature will, through the connecting spring 41, cause the pendulum 42 to which is affixed a weight 43, to swing to the right, which will cause the breaking of the magnet 38. The breaking of this circuit will permit the spring 40 to retract the armature 37 to condition the pawl 36 to later advance the toothed wheel 35 another step upon a subsequent energization of the electromagnet 38, the retaining pawl 52 maintaining the toothed wheel in its advanced position after each step.

The pendulum 42 will now return by the force of gravity to contact-closing position, wherein the contacts 44—45 are closed, thus operating the electromagnet 38 again to cause the toothed wheel to be advanced, and this action is continuous, the pendulum pursuing a reciprocatory motion and the pawl stepping the toothed wheel at a regular rate under the control of the pendulum, until the projection 47 carried on the wheel 46 reaches such an advanced position wherein the contacts 48 are closed; and if, in the meantime, the engine cranking has successfully started the engine to moving under its own power, whereby to drive the starting-generating dynamo 6, then operating as a motor, the charging current passing through the low resistance winding of the relay 16 will reinforce the effect of the winding 17 to overcome the power of the spring 59, and open the contacts 58. In such a case the closure of the contacts 48, after a predetermined length of time, will have no effect, as the circuit controlled by these contacts will be broken at the contacts 58 of the relay 16.

The narrative of operation will be resumed, assuming that the engine is properly operative to charge the storage battery, prior to the closure of the contacts 48. The charging will now continue and the timing mechanism will continue to operate during the charging period until such time as the charging mechanism is operated for a predetermined length of time, when the contacts 49 will be operated by the advancing projection 47. The contacts 49 being operated, a circuit will be closed for the electromagnet 51, comprising the now closed contacts 12 of the relay 14, the contacts 49, normally closed contacts 24 of the relay 21 and normally closed contacts 25 of a manually operable restoring key 60. The electromagnet 51 will, therefore, be energized and its armature attracted to move the catch 61 over the pin 62 carried on the pawl 52, so as to condition the catch 61 to withdraw the pawl 52 from engagement with the toothed wheel 35 whenever the electromagnet 51 is subsequently de-energized. The electromagnet 51 is de-energized soon after by the advancing projection 47, opening contacts 50 in its circuit, and the pawl 52 being withdrawn under the power of the spring 63, the timing mechanism will be restored to normal position, shown in the drawing. Also, the opening of the contacts 50 will open the circuit of the locked electromagnet 14 and the electromagnet 14 will be de-energized, opening the contact sets 9, 10, 11, 12 and 13, restoring the circuits controlled thereby, previously described, to normally open operative position. The electromagnet 19 being thereupon de-energized will open the contacts 20, disrupting the charging circuit between the storage battery B and the charging generator 6.

The narrative will now be resumed, with the assumption that the charging apparatus was inoperative to charge the storage battery, and that after a predetermined length of time, subsequent to the initiation of the engine-cranking period the contacts 48 were closed, as previously described. Under such a condition the contacts 58 of the relay 16 will be closed, and a circuit will be completed for the relay 21, comprising the contacts 48 and the contacts 58 and the storage battery B, causing the energization of the relay 21. The relay 21 being energized will close a locking circuit for itself, comprising normally open contacts 22 of the relay 21, said contacts being thereupon placed in multiple with the serially connected contacts 58 and 48 mentioned. Also, the contacts 24 of the relay 21 will be broken, thus disrupting the circuit of the winding for the relay 14, said relay being de-energized, and being what is known as a slow releasing relay, will slowly restore its contact sets to normally open position. However, prior thereto the closure of the contacts 23 of the relay 21 will complete a circuit for the timing mechanism magnet winding 51, said circuit including the then closed contacts 12 of the relay 14, to momentarily energize the magnet 51, so that the catch 61 will advance and engage the pin 62 on the pawl 52, so that the relay 14 de-energizing and subsequently breaking the contacts 12 in the circuit of the relay winding 51, will cause the restoring of the timing mechanism, the de-energizing relay 51 permitting its armature to be retracted by the spring 53 and the catch 61 moving to the left, moving with it the pawl 52 from engagement with the teeth on the ratchet wheel 35.

It will be noted that the pin carried by the ratchet wheel 35 in normal position raises the arm 66 and which arm carries the catch 61, so that the pawl 52 is released by the catch 61 whenever the timing mechanism is restored to normal position and the pawl again takes a ratchet wheel contacting position.

The relay 21 will then remain energized until de-energized by manual opening of the contacts 25 of the key 60, or the manual opening of the contacts of the switch 67, said key and said switch contacts being included in the circuit of the winding of the said relay 21. As long as the relay 21 is operated, however, a signal bell 27, or any other desired type of signal will be operated by the closure of a circuit comprising the said bell, said circuit comprising contacts 23 of the relay 21 and the battery B. The controlling armature 31 is also influenced by the low resistance winding 26 operating differentially to the effect of the high resistance winding 2 whenever the service leads 34 are bridged by an electrical load on the system and the effect of the winding 26, which is serially included in circuit with such a load, is to cause the closure of the contacts 3 against the power of the winding 2 whenever the external load is heavy enough to produce a sufficient flow of current through the winding 26, and whenever the condition of charge of the storage battery is sufficiently low to permit such a flow of current as passes through the winding 26 to overcome the effect of the current from the storage battery directly through the winding 2.

Thus, when the system is being used to supply light and power from the storage battery B, whenever power devices requiring a considerable amount of current are operated, the charging will be started, if the condition of charge of the storage battery is sufficiently lowered to a degree predetermined, the said condition of charge, however, being such that without the use of the electromagnet 26 the contacts 3 would have remained separated. I thus have heavy loads under proper conditions accomplish the charging when otherwise the condition of charge of the batteries would have to be lowered a great deal more before such charging could be accomplished.

Having thus described my invention in a particular embodiment and in connection with certain instrumentalities, I am aware that the invention may be embodied in apparatus taking other forms and using different instrumentalities, but having the same mode of operation, operating substantially in the same way to achieve the same results, but which departures from the embodiment herein illustrated would still be within the spirit of my invention.

What I claim as my invention is:

1. In an electric system, an accumulator, an engine, a generator, said engine being adapted to drive said generator, said generator when driven being adapted to charge said accumulator, controlling means to cause said engine to drive said accumulator, means responsive to the condition of charge of the said accumulator for controlling the said controlling means, a timing mechanism normally quiescent adapted to be started into operation by the said controlling means whenever the said accumulator has reached a predetermined low condition of charge, and means to discontinue the charging of the said accumulator, and the operation of the said engine when the said timing mechanism is operated a predetermined length of time, and means responsive thereto to discontinue the operation of the said timing mechanism.

2. In combination, an electromagnetic machine, an internal combustion engine, an electric accumulator, a charging circuit comprising said accumulator and said electromagnetic machine, means to cause the cranking of said engine, timing mechanism to discontinue said cranking after a predetermined short period of time, if said cranking is not then effective to charge said battery, and means under the control of said mechanism to rupture said charging circuit and to stop the engine after a predetermined longer period of time.

3. In an electric system, an accumulator, an engine, a generator, said engine being adapted to drive said generator, said generator when driven being adapted to charge said accumulator, controlling means to cause said engine to drive said generator, and normally quiescent timing means adapted to be started when the charge of the accumulator has reached a predetermined low point, and means associated with the said timing means to restore its quiescent condition after a predetermined length of time, said last named means being operable to discontinue the charging of the accumulator.

4. In an electric system, an accumulator, an engine, a generator, said engine being adapted to drive said generator, said generator when driven being adapted to charge said accumulator, controlling means to cause said engine to drive said generator, and normally quiescent timing means adapted to be started when the charge of the accumulator has reached a predetermined low point, and means associated with the said timing means to restore its quiescent condition after a predetermined length of time, said last named means being operable to discontinue the charging of the accumulator, said timing means thereupon having all of its parts automatically restored to normal position.

5. In an electric system, an accumulator, an engine, a generator, said engine being adapted to drive said generator, said generator when driven being adapted to charge said accumulator, controlling means to cause said engine to drive said generator, and timing means to limit the duration of charge of the accumulator, said timing mechanism being adapted to discontinue the effort of the said controlling means to start the engine, if the engine fails to operate under its own power in a predetermined length of time.

6. In an electric system, an accumulator, an engine, a generator, said engine being adapted to drive said generator, said generator when driven being adapted to charge said accumulator, controlling means to cause said engine to drive said generator, and timing means to limit the duration of charge of the accumulator, said controlling means controlling said timing means, and said timing mechanism being adapted to discontinue the effort of the said controlling means to start the engine, if the engine fails to operate under its own power in a predetermined length of time.

7. In an electric system, an accumulator, an engine, a generator, said engine being adapted to drive said generator, said generator when driven being adapted to charge said accumulator, controlling means to cause said engine to drive said generator, and normally quiescent timing means adapted to be started when the charge of the accumulator has reached a predetermined low point, and means associated with the said timing means to restore its quiescent condition after a predetermined length of time, said last named means being operable to discontinue the charging of the accumulator, and electromagnetic means, said electro-magnetic means being adapted to be energized by current from the said accumulator.

8. In an electric system, an accumulator, an engine, a generator, said engine being adapted to drive said generator, said generator when driven being adapted to charge said accumulator, controlling means to cause said engine to drive said generator, and normally quiescent timing means adapted to be started when the charge of the accumulator has reached a predetermined low point, and means associated with the said timing means to restore its quiescent condition after a predetermined length of time, said last named means being operable to discontinue the charging of the accumulator, said timing means thereupon having all of its parts automatically restored to normal position, and electro-magnetic means, said electro-magnetic means being adapted to be energized by current from the said accumulator.

9. In an electric system, an accumulator, an engine, a generator, said engine being adapted to drive said generator, said generator when driven being adapted to charge said accumulator, controlling means to cause said engine to drive said generator, means responsive to the condition of charge of the accumulator controlling said controlling means, a variable external load for the accumulator, mechanism responsive to the amount of said load for controlling the said means, and timing means to limit the duration of charge of the accumulator, said timing means being adapted to discontinue the effort of the said controlling means to start the engine, if the engine fails to operate under its own power in a predetermined length of time.

In witness whereof, I have hereunto set my hand this 10th day of January, 1921.

FRANK M. SLOUGH.